(12) United States Patent
Stephenson et al.

(10) Patent No.: US 8,594,828 B2
(45) Date of Patent: Nov. 26, 2013

(54) SYSTEM AND METHOD FOR OPTIMIZING A PAPER MANUFACTURING PROCESS

(75) Inventors: Brian Kent Stephenson, Georgetown, TX (US); David G. Hoch, Falmouth, ME (US); L. Paul Collete, III, Westminster, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1039 days.

(21) Appl. No.: 12/242,378

(22) Filed: Sep. 30, 2008

(65) Prior Publication Data
US 2010/0082120 A1    Apr. 1, 2010

(51) Int. Cl.
*G06F 7/66* (2006.01)
*G05B 13/00* (2006.01)
*D21G 9/00* (2006.01)
*G05B 17/02* (2006.01)
*G05B 13/04* (2006.01)

(52) U.S. Cl.
CPC ............ *D21G 9/0009* (2013.01); *D21G 9/0027* (2013.01); *G05B 17/02* (2013.01); *G05B 13/042* (2013.01)
USPC .................. 700/127; 700/28; 700/29; 700/30; 700/128; 162/198

(58) Field of Classification Search
USPC .......... 700/28–31, 38, 44, 127, 128; 162/198; 702/81
See application file for complete search history.

(56) References Cited

U.S. PATENT DOCUMENTS

| | | | | |
|---|---|---|---|---|
| 3,619,360 A | * | 11/1971 | Persik, Jr. | ...................... 700/128 |
| 3,767,900 A | * | 10/1973 | Chao et al. | ...................... 700/31 |
| 4,764,253 A | * | 8/1988 | Cheshire et al. | .............. 162/198 |
| 5,060,132 A | * | 10/1991 | Beller et al. | ..................... 700/38 |
| 5,121,332 A | * | 6/1992 | Balakrishnan et al. | ........ 700/127 |
| 5,347,446 A | * | 9/1994 | Iino et al. | ......................... 700/29 |
| 5,638,284 A | * | 6/1997 | Helmer et al. | ................. 700/127 |
| 5,680,321 A | * | 10/1997 | Helmer et al. | ................... 702/30 |

(Continued)

OTHER PUBLICATIONS

Adamopoulos, S.; Martinez, E.; and Ramirez, D., "Characterization of Packaging Grade Papers From Recycled Raw Materials Through the Study of Fibre Morphology and Composition", Dec. 2005, Global NEST Journal, vol. 9, No. 1, pp. 20-28.*

(Continued)

*Primary Examiner* — Mohammad Ali
*Assistant Examiner* — Kelvin Booker
(74) *Attorney, Agent, or Firm* — Fletcher Yoder; William R. Walbrun; John M. Miller

(57) ABSTRACT

A technique is disclosed for optimizing a quality parameter in a process that is not directly measurable online using conventional measurement devices. The technique includes the use of a first inferential model to predict a value for the parameter based upon other process variables. A second inferential model predicts a residual component of the process parameter based off non-controllable residual variables of the process. The inferential model outputs are combined to produce a composite predicted value which may be further adjusted by an actual prediction error determined via comparison with an offline measurement. The adjusted predicted value is provided to a dynamic predictive model which may be adapted to implement control actions to drive or maintain the quality parameter at a target set point. The technique may further consider cost optimization factors and production reliability factors in order to produce a product meeting the target quality set point or range while considering production requirements and minimizing overall costs.

21 Claims, 6 Drawing Sheets

(56) References Cited

U.S. PATENT DOCUMENTS

| | | | |
|---|---|---|---|
| 5,740,033 A * | 4/1998 | Wassick et al. | 700/29 |
| 5,800,647 A * | 9/1998 | Andersen et al. | 156/69 |
| 5,812,404 A * | 9/1998 | Hamalainen et al. | 700/128 |
| 5,825,653 A * | 10/1998 | Huovila et al. | 700/128 |
| 5,954,922 A * | 9/1999 | Ramarao | 162/198 |
| 6,056,781 A * | 5/2000 | Wassick et al. | 700/28 |
| 6,080,278 A * | 6/2000 | Heaven et al. | 162/198 |
| 6,086,237 A * | 7/2000 | Gorinevsky et al. | 700/127 |
| 6,092,003 A * | 7/2000 | Hagart-Alexander et al. | 700/129 |
| 6,180,037 B1 * | 1/2001 | Andersen et al. | 264/108 |
| 6,207,017 B1 * | 3/2001 | Munch et al. | 162/198 |
| 6,301,373 B1 * | 10/2001 | Bernie et al. | 382/108 |
| 6,405,140 B1 * | 6/2002 | Chen et al. | 702/35 |
| 6,421,575 B1 * | 7/2002 | Shakespeare | 700/127 |
| 6,466,877 B1 * | 10/2002 | Chen et al. | 702/35 |
| 6,490,572 B2 * | 12/2002 | Akkiraju et al. | 706/19 |
| 6,597,959 B1 * | 7/2003 | Backa et al. | 700/30 |
| 6,748,279 B2 * | 6/2004 | Bennett | 700/28 |
| 6,772,036 B2 * | 8/2004 | Eryurek et al. | 700/127 |
| 7,085,615 B2 * | 8/2006 | Persson et al. | 700/108 |
| 7,204,914 B2 * | 4/2007 | Lampela | 700/127 |
| 7,213,174 B2 * | 5/2007 | Dahlquist | 714/37 |
| 7,356,377 B2 * | 4/2008 | Schwarm | 700/108 |
| 7,386,426 B1 * | 6/2008 | Black et al. | 703/2 |
| 7,454,253 B2 * | 11/2008 | Fan | 700/29 |
| 7,463,937 B2 * | 12/2008 | Korchinski | 700/31 |
| 7,496,413 B2 * | 2/2009 | Fan et al. | 700/29 |
| 7,582,189 B2 * | 9/2009 | Pihola et al. | 700/128 |
| 7,599,751 B2 * | 10/2009 | Cutler | 700/38 |
| 7,846,299 B2 * | 12/2010 | Backstrom et al. | 700/127 |
| 7,930,044 B2 * | 4/2011 | Attarwala | 700/44 |
| 7,964,064 B2 * | 6/2011 | Weinstein et al. | 162/198 |
| 8,032,236 B2 * | 10/2011 | Stephenson et al. | 700/33 |
| 8,206,554 B2 * | 6/2012 | Pihola | 162/198 |
| 2003/0036890 A1 * | 2/2003 | Billet et al. | 703/2 |
| 2003/0149603 A1 * | 8/2003 | Ferguson et al. | 706/22 |
| 2004/0002786 A1 * | 1/2004 | Sasaki | 700/127 |
| 2004/0256069 A1 * | 12/2004 | Saucedo et al. | 162/158 |
| 2005/0010308 A1 * | 1/2005 | Bennett | 700/28 |
| 2005/0016704 A1 * | 1/2005 | Huhtelin | 162/198 |
| 2005/0034824 A1 * | 2/2005 | Lampela | 162/49 |
| 2005/0088653 A1 * | 4/2005 | Coates et al. | 356/419 |
| 2005/0187643 A1 * | 8/2005 | Sayyar-Rodsari et al. | 700/29 |
| 2005/0228511 A1 * | 10/2005 | Das et al. | 700/28 |
| 2006/0111858 A1 * | 5/2006 | Zhu | 702/85 |
| 2006/0162887 A1 * | 7/2006 | Weinstein et al. | 162/198 |
| 2006/0282343 A1 * | 12/2006 | Palanisamy et al. | 705/28 |
| 2006/0284058 A1 * | 12/2006 | Coates et al. | 250/226 |
| 2007/0100475 A1 * | 5/2007 | Korchinski | 700/28 |
| 2007/0118236 A1 * | 5/2007 | Bennett | 700/28 |
| 2007/0208436 A1 * | 9/2007 | Das et al. | 700/44 |
| 2009/0133845 A1 * | 5/2009 | Huhtelin | 162/4 |
| 2009/0143871 A1 * | 6/2009 | Gao et al. | 700/29 |
| 2009/0319059 A1 * | 12/2009 | Renfro et al. | 700/30 |
| 2010/0082121 A1 * | 4/2010 | Stephenson et al. | 700/30 |
| 2010/0204808 A1 * | 8/2010 | Thiele | 700/30 |
| 2012/0023061 A1 * | 1/2012 | Stephenson et al. | 706/52 |

OTHER PUBLICATIONS

Andre, N.; Cho, H-W; Baek, S.H.; Jeong, M-K; and Young, T.M., "Prediction of internal bond strength in a medium density fiberboard process using multivariate statistical methods and variable selection", May 2007, Wood Science Technology, DOI 10.1007/S00226-008-0204-7.*

Clapp, Jr., N. E.; Young, T.M.; and Guess, F.M., "Predictive modeling the internal bond of medium density fiberboard using a modified principal component analysis", Feb. 2007, Forest Products Journal, vol. 58, No. 4, pp. 49-55.*

Schweiger, C.A. and Rudd, J.B., "Prediction and Control of Paper Machine Parameters Using Adaptive Technologies in Process Modeling", Dec. 1993, Tappi Journal, vol. 77, No. 11.*

* cited by examiner

SYSTEM AND METHOD FOR OPTIMIZING A PAPER MANUFACTURING PROCESS

BACKGROUND

Embodiments of the present invention relate generally to control systems and, more particularly, to model predictive techniques for the optimization and management of various process parameters in a paper manufacturing process.

While a diverse number of manufacturing processes currently exist for producing a wide variety of products, these manufacturing processes typically share the common goal of ensuring that a resulting product conforms to certain target quality specifications. In parallel to achieving certain quality targets, many manufacturing processes also share the common goal of ensuring that the cost to achieve target quality is managed or optimized. In controlling a process in this regard, a determination as to whether a resulting product conforms to a particular quality standard may be indicated by one or more quality parameters derived during the process. In some instances, these quality parameters may be measured online directly from the process by using one or more measurement devices, such as sensors, transducers, or the like. Thus, using these "on-process" measured quality parameter values, a control system monitoring the manufacturing process may be able to adjust one or more other process variables in order to maintain the quality parameter at a desired target value (e.g., a set point, range, or maximum, etc.).

In some processes, however, certain parameters, including those relating to production costs, product quality, and various process runtime properties, may not be directly measurable using conventional sensors and measuring devices. For example, in a paper manufacturing process, certain quality properties of the finished paper products may only be determined by taking a sample of the finished paper from the paper machine and performing various destructive tests in a testing setting that is separate from the process, such as in a dedicated or automated testing system, through one or more laboratory-based tests or measurements, or by other offline product testing arrangements (e.g., including offline sensors not in direct communication with the process system). These samples may normally be taken when a reel of finished paper is removed from the paper machine. Thus, these "off-process" measurements may not be available for use in process control purposes during the production of the reel from which the measurement is obtained. Further, due to operation costs and logistics, it is not always feasible or practical to sample each finished reel. As a result, there may only be sporadic off-process measurements of the quality parameter available to a machine operator.

In some instances, control of the paper manufacturing process has been accomplished using manual procedures performed by a machine operator based on the above-mentioned off-process measurement results, as the feedback information required for closed loop control may not be available. However, the use of off-process analysis to obtain such parameters may be problematic because substantially quantities of product, even one or more rolls of paper, may be produced before changes in control based on the off-process test results may be implemented. Additionally, optimization of the paper manufacturing process may require the manual control of various unit operations within the paper manufacturing plant that govern certain specific areas of the paper making process, which may be independent or disconnected from each other (e.g., non-networked; non-integrated controls). Further, even if manual control of a paper quality parameter could be achieved, such control typically does not take into consideration the materials and operational costs associated with production. That is, any manual control or potential optimization of a process may require that the operator consistently adhere to management-defined guidelines relating to the trade off between the quality of the final product as well as the cost of the materials. Accordingly, there exists a need for an improved technique for controlling certain quality parameters in processes that are not directly measurable online.

BRIEF DESCRIPTION

In general, the present technique provides a control system adapted to control and optimize a manufacturing process based upon a parameter that is typically only measurable in an off-process setting. For instance, certain parameters, such as quality related parameters in a manufactured product, are typically directly measurable only through the use of destructive testing in off-process measurement procedures. A control system implementing the present technique may be adapted to control a quality parameter based upon a predicted value of the quality parameter in order to determine control actions that may be implemented in the manufacturing process to maintain the quality parameter at or drive the quality parameter towards a desired target value, which may be defined as a set point having a range of tolerance. In particular, as will be described below, the present techniques may be well-suited for the control of various quality parameters in the manufacturing of paper products, although it should be appreciated that the presently described techniques may be generally applicable to any type of process requiring the control of a process parameter that is generally only measurable offline.

The basis for such control system designs may include parametric models, neural network models, linear and non-linear models, to name only a few. In one presently contemplated embodiment, the quality parameter may be controlled by separating control of the process into a first inferential model and a second separate inferential model (e.g., virtual online analyzers). The first inferential model may be configured to predict a raw value for the quality parameter by differentially determining a raw estimation for the parameter based on the relationships between one or more manipulated variables (MV's) and/or disturbance variables (DV's) of the process. As will be appreciated, MV's are those variables which a process has control authority over, are considered by the raw prediction model and the control model, and may be manipulated by a controller in order to achieve the targets or goals indicated by control variables (CV's) which the controller tries to bring to some objective (e.g., to a target set point, maximum, etc.). DV's may be regarded as those variables which directly contribute to the resulting objective parameter (e.g., paper quality parameter), and are considered by the raw prediction model and the control model, but are those which the controller may not have direct control or authority over.

The second inferential model may consider additional non-controlled but observable parameters of the process. These additional parameters, referred to herein as "residual variables (RV's)," are generally distinguishable from disturbance variables in that they are not included in or considered by the raw estimation inferential model or the control model. For example, certain RV's may represent variables having minimal dynamics and thus minimal feed forward value. However, these residual variables may nevertheless have some impact or influence on the controlled quality parameter. By way of example, in one contemplated embodiment, a residual component derived by the second inferential model using residual variables may reflect the estimation of an expected prediction error between the raw estimated parameter value determined by the first inferential model and a corresponding off-process measurement of the controlled parameter. Thus, the estimated raw parameter value and the residual component from the two models may be combined to generate a composite estimated output that takes into account an unmeasured disturbance effect (e.g., the residual) addressed by the second inferential model.

While this two-part model approach may reduce the amount of prediction error in the composite estimation of the parameter value, some inaccuracy may still exist due to additional unmeasured disturbances and, in some cases, immeasurable disturbances in the process system. Accordingly, an actual prediction error may be determined by comparing the composite value with a corresponding off-process test measurement of a sample of a finished product. This prediction error may be used to bias the composite output of the inferential models, thus producing an adjusted predicted value of the quality parameter. The adjusted predicted value may then be provided to a dynamic predictive model which may implement appropriate control actions in the paper manufacturing process in order to control the quality parameter based on a known target set point, range, or upper/lower limit.

Accordingly, the present technique provides the ability to "bias" or correct "raw" calculations (e.g., generating the composite estimation) before combination of the inferential model outputs via another corrective value (e.g., a measured prediction error based upon lab results). Further, in addition to controlling the process based on the estimation of the quality parameter value, the present technique may further take into account various optimization factors, such as those based on process reliability and costs, for example. For instance, a control system in accordance with the present technique may attempt to minimize the overall cost of producing a product across an entire control horizon, bounded by constraints imposed by quality and reliability (e.g., production or process) targets. Overall, the application of the techniques described herein may thus advantageously provide for the accurate estimation of a process parameter that is typically not directly measurable online, the control of a process based on the estimation and, in certain embodiments, further provide for the minimization of production costs and maximization of production, in addition to producing a product that meets target quality criteria.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
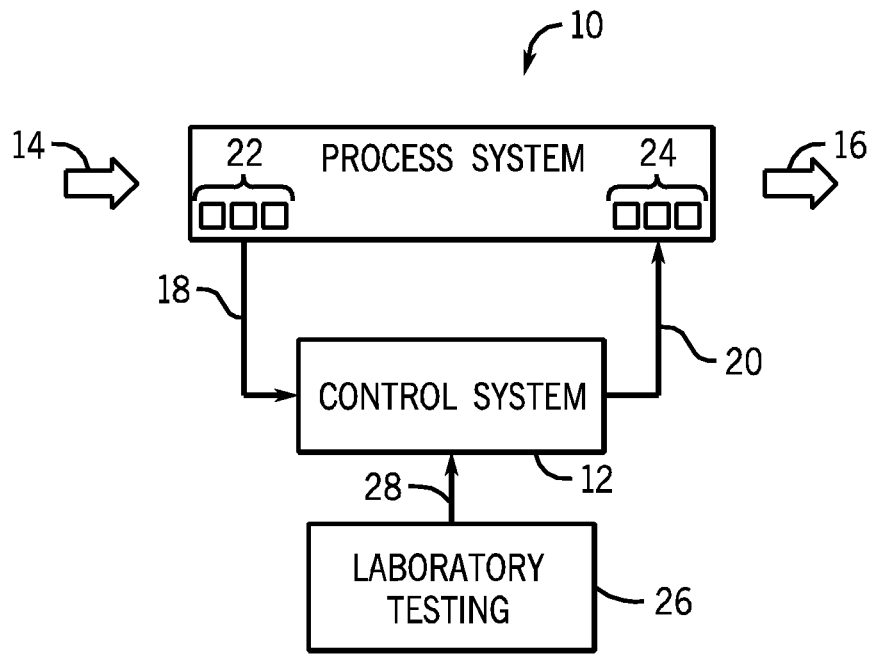
FIG. 1 is a diagrammatical representation of a process system equipped with a control system designed to implement the present technique.

Turning now to the drawings, and referring first to FIG. 1, a process system 10 is illustrated that is at least partially regulated by a control system 12. As will be appreciated by those skilled in the art, the process system 10 may be any conceivable type of process, such as a manufacturing process, a steady state or batch process, a chemical process, a material handling process, an energy production process, and so forth. In an exemplary embodiment, as will be described in further detail below with reference to FIG. 5, the process system 10 may be implemented in the context of a paper manufacturing process.

In general, the process system 10 of FIG. 1 may receive one or more inputs 14, and produce one or more outputs 16. By way of example, in complex processes found in the industry, many such inputs may be utilized, including feed stocks, raw materials, electrical energy, fuels, parts, assemblies and subassemblies, and so forth. Outputs may include finished products, semi-finished products, assemblies, manufacturing products, by products, and so forth. Based upon the system dynamics, the physics of the system and similar factors, the control system 12, may regulate operations of the process system 10 in order to control both the production of the outputs as well as quality of the outputs, and so forth.

In the presently illustrated embodiment, the control system 12 may perform control functions 20 in response to process information 18 received from the process system 10. For instance, the process information 18 may be provided by one or more sensors 22 configured to detect and/or measure certain parameters of the process system 10, which may include measurements representative of both MV's, DV's, and CV's. In general, such sensors 22 may include measurement devices, transducers, and the like that may produce discrete or analog signals and values representative of various variables of the process system. Such sensors 22 commonly produce voltage, current, or digital outputs that are representative of the sensed variables. The process information 18 may represent "on-process" measurements of various parameters obtained directly from the process (e.g., using the sensors 22). As used herein, the terms "on-process measurements" or "online measurements" or the like shall be understood to refer to measurements of process parameters acquired directly from the process system 10. Additionally, the process information 18 may also include controllable and external operating constraints, as well as user-specified set points.

The sensors 22 may be coupled to one or more controllers of the control system 12. In practice, many such sensors and more than one controller may be provided in the control system 12. For instance, referring now to FIG. 2, the control system 12 is illustrated as including multiple controllers, designated by the reference numerals 30, 32, and 34. Each controller 30, 32, and 34 may include an application-specific or general purpose computer programmed to carryout the functions described herein. The controllers 30, 32, and 34 may each receive process information (PI) 18, represented herein by the reference labels $PI_1$, $PI_2$, and $PI_n$, respectively. Based on the process information received, each controller 30, 32, and 34, may generate appropriate control outputs (CO), indicated herein by the reference labels $CO_1$, $CO_2$, and $CO_n$, respectively. Where multiple controllers are provided, such as illustrated in the present figure, each controller may be adapted to cooperatively function with one or more of the other controller(s) within the control system 12 to control the process system 10. In one embodiment, the controllers 30, 32, and 34 may utilize model predictive control (MPC) techniques.

Figure 2:
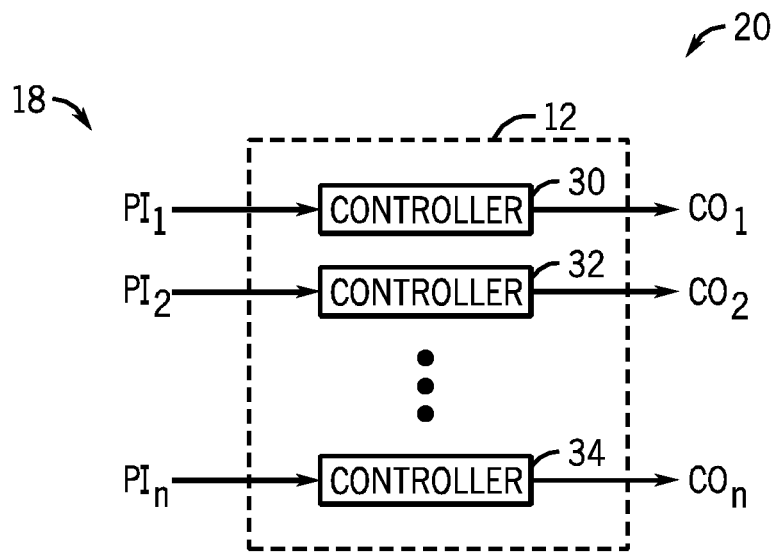
FIG. 2 is a diagrammatical representation illustrating a plurality of controllers which may be included with the control system depicted in FIG. 1.

Referring back to FIG. 1, the control outputs $CO_1$, $CO_2$, and $CO_n$ illustrated in FIG. 2 may be representative of control actions or functions 20 provided to one or more actuators 24 that serve to alter portions of the process system 10 to regulate the process output 16. Such actuators 24 may include, by way of example only, valves, motors, position devices, pumps, and so forth. The sensors 22 may provide signals representative of measured values of process variables (MV's, DV's, or CV's). These measured values again, may be analog or digital signals or values, and may be measured directly by the sensors, or in certain applications may be derived from certain other measured values. As one skilled in the art will appreciate, based upon certain measured values, a controller (e.g., 30, 32, or 34) or other signal processing circuitry may develop or derive values for certain system parameters based upon a predictive control model, which may define mathematical relationships between the measured values and those desired parameters. Such inference may be particularly useful where control is desired based upon particular system parameters that are impossible or difficult to measure online (e.g., directly from the process). For instance, as discussed above, certain process parameters, such as a quality parameter in a finished product unit 16 produced by the process system 10, may only be determined using destructive testing procedures in an offline testing arrangement (e.g., using laboratory-based measurements, automated or dedicated testing systems, offline sensors) that is separate relative to the process system 10. As used herein, the terms "off-process measurements" or "offline measurements" or the like shall be understood to refer to measurements of process parameters acquired in such settings which are separate from the process system 10. Accordingly, off-process measurements may not be available for control purposes during the production period in which the product unit 16 from which the off-process measurement is obtained is being produced. Thus, the present technique for model predictive control may employ inferential models, which may effectively operate as a virtual sensor by differentially determining certain desired variables for control purposes. By way of example, such virtual sensors may be provided by a Virtual On-line Analyzer®, available from Pavilion Technologies, Inc., of Austin, Tex.

While the presently described techniques may provide for the online prediction or estimation during the process of values for process parameters typically only directly measurable by performing a off-process destructive testing or measurement procedures on a finished product, the use of the actual corresponding off-process measurements may, nevertheless, be further utilized to apply corrective biasing to the prediction results determined by inferential models. For instance, as shown in FIG. 1, the control system 12 may be configured to communicate with and receive data from a separate offline laboratory testing facility, represented here by the reference numeral 26. While this component has been referred to herein as a "laboratory testing facility" for purposes of the present discussion, it should be understood that the offline testing arrangement represented by the reference numeral 26 may include any conceivable type of testing arrangement capable of obtaining and providing off-process measurements of process parameters, including automated or dedicated testing equipment, offline sensors, to name just a few.

As discussed above, samples of the finished product 16 may be provided to the laboratory testing facility 26 for further testing to obtain off-process measurements of certain parameters, such as quality parameters, to determine if the finished product meets particular quality targets. Generally, the laboratory testing facility 26 may provide for one or more destructive tests to acquire a particular measurement for a quality parameter of the resulting product 16. By way of example, in a paper manufacturing setting, the laboratory testing facility 26 may perform destructive testing procedures on a paper sample to determine one or more internal strength parameters, including tests for determining an internal bond strength, such as "Scott bond." As will be understood by those skilled in the art, internal bond measurements are generally used to reflect the internal bond strength of papers made from various pulps. Accordingly, off-process measurements of the above-discussed quality parameters, represented here by the reference numeral 28, may be provided to the control system 12 for comparison with a corresponding predicted parameter value. If an offset or prediction error exists between the lab measurement 28 and the predicted values, the control system 12 may provide for the biasing or correction of the predicted values using the prediction error. Thus, the control system 12 may implement process control actions 20 based on one or more estimated parameters that have been adjusted to correct for a prediction error and, based on the adjusted prediction, determine the necessary control actions required to optimize the process based on a particular objective (e.g., maintaining a quality target). Similarly, the control system 12 may implement control actions 20 based on one or more cost parameters or the aggregation of one or more cost parameters in order to minimize the overall production costs, for example.

Based on the adjusted prediction values, the control system 12 may implement model predictive control techniques to determine the appropriate control action or actions (e.g., manipulation of MV's to particular set points) required to achieve a control objective, such as maintaining a quality parameter at a certain target value or range or minimizing cost to achieve a specific quality target or range. In some embodiments the optimization of the process system 10 may further be defined by one or more objective or cost functions associated with a controller, as will be discussed in further detail below. Further, in practice, the desired set points of certain process variables determined by a controller may or may not be communicated to the actuators 24 themselves. That is, the actuators 24 may receive drive signals having the effect of moving certain process parameters towards their desired set points, such as a valve position signal for driving a valve actuator in order to cause a desired flow rate, the flow rate itself being the desired set point for an MV or CV.

Figure 3:
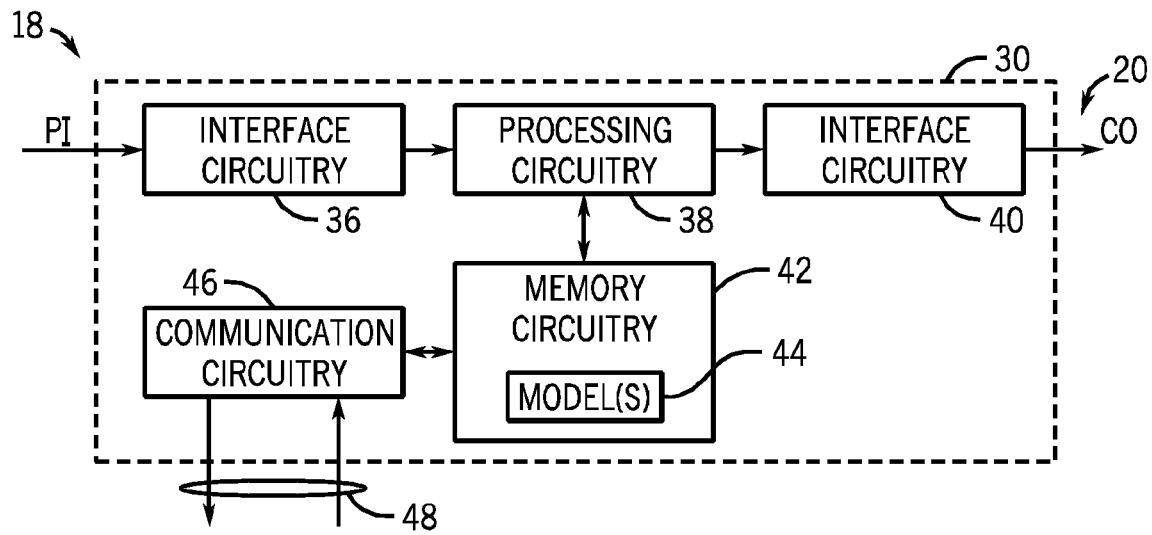
FIG. 3 is a diagrammatical representation of certain functional components which may be included in the controllers of FIG. 2.

FIG. 3 illustrates certain exemplary components that may be included in an MPC controller of the type illustrated in FIG. 2. Many other components may be included, depending upon the system design, the type of system controlled, the system control needs, and so forth. In the illustrated embodiment, the interface circuitry 36 receives process information 18 which, as discussed above, may include values or signals obtained using the sensors 22. The interface circuitry 36 may include filtering circuitry, analog-to-digital conversion circuitry, and so forth. In certain implementations, the interface circuitry 36 may also include database synchronization and data management functions. The interface circuitry 36 is in data communication with the processing circuitry 38, which may include any suitable processor, such as a microprocessor, a field programmable gate array, and so forth. The processing circuitry 38 may carry out control functions and, in the present embodiment, may perform model predictive control or optimization functions based upon knowledge of certain aspects of the process system 10. By way of example, the processing circuitry 38 may execute one or more model predictive control algorithms to develop values for the controlled variable, including forward-looking trajectories for MV's and CV's. Such algorithms, as illustrated herein, may be defined by one or more control models 44 stored in a memory circuit 42 communicatively coupled to the processing circuitry 38. In practice, the one or more control models 44 may include a plurality of control models operating in cooperation to achieve a particular control result. The memory circuit 42 may also include control routines executed by the processing circuitry 38, as well as certain desired variables, variable settings, set points, and so forth.

Figure 4:
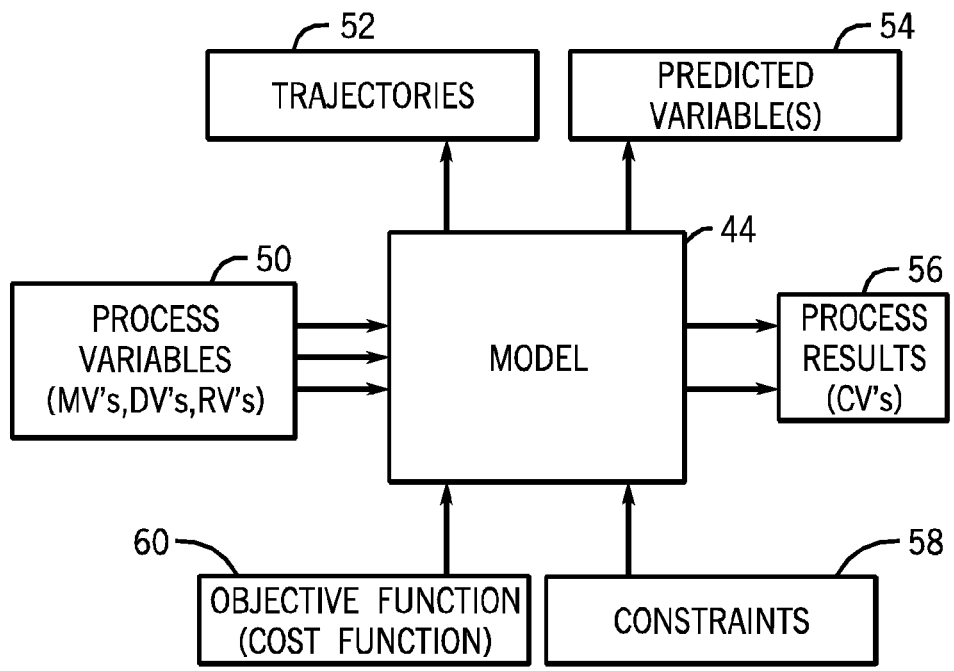
FIG. 4 is a diagrammatical representation of a dynamic multivariable predictive model that may be implemented by a controller of FIG. 2.

Referring briefly to FIG. 4, an exemplary dynamic multi-variable predictive model 44 which may govern the control actions implemented by the controller 30 is illustrated. As one skilled in the art will appreciate, a dynamic predictive model may define mathematical relationships that include not only steady state relationships, but also time varying relationships required for each parameter change to be realized in an output. In other words, a model 44 may not only define how changes in certain process variables affect other process variables, but also rates at which such changes occur. Based on such relationships, the model 44 may derive or predict one or more anticipated trajectories representing desired future values or set points for particular process variables or costs over a period of time, illustrated herein by reference numeral 52. The trajectories 52 may be determined based at least partially on certain operating constraints 58 imposed on the controller 30 as well as one or more objective functions 60 associated with the controller. Additionally, where control of the process may rely on the knowledge of certain parameters not directly measurable online, as mentioned above, the model 44 may be adapted to predict or infer the values of such parameters, as indicated by the reference number 54) based on the states of other process variables (e.g., 50) in the process system 10.

As discussed above, the constraints 58 may include controllable constraints (e.g., those that a process has the ability and discretion to change) as well as external constraints (e.g., those outside of the process itself). Essentially, the constraints 58 imposed on a particular controller may be representative of limits by which a controller may manipulate certain MV's in controlling a process. An objective function 60 may be a mathematical relationship which defines or sets the goal or goals for the overall optimization of the process 10 (or sub-processes within a process). In general, an objective function 60 may provide one or more consistent numerical metrics by which a process or sub-process strives to achieve and over which the performance of the process or sub-process may be measured or evaluated. As will be appreciated, an objective function 60 may be defined in terms of either objectives to be obtained or maximized or costs to be achieved or minimized, or both. For instance, in a manufacturing process, an objective function may be provided by a cost function designed to minimize the overall production costs of manufacturing a particular product. Accordingly, it should be understood that the model 44 may attempt to achieve one or more process results or targets (CV's) 56 based on the control or manipulation of set points for one or more other process variables (MV's) in accordance with a desired or target set point value for a particular controlled variable, the aforesaid trajectories 52, constraints 58, and/or objective function 60 associated with the controller.

Returning back to FIG. 3, the processing circuitry 38 based upon the control algorithm or algorithms defined in the one or more models 44, may output signals to the interface circuitry 40 that may be used to drive the actuators 24 of the process system 10, as discussed above. The interface circuitry 40 may include various driver circuits, amplification circuits, digital-to-analog conversion circuitry, and so forth. That is, using the process information 18 received (which may include measured or inferred values of the MV's or CV's), the controller 26 may determine appropriate control actions or outputs based on the variable relationships, constraints, and/or objectives defined by the control models 44. Further, in optimization strategies where multiple controllers operate in a cooperative fashion, such as illustrated in FIG. 2, communications interface circuitry 46 will be generally provided to each controller. By way of example, the communications interface circuitry 46 may include networking circuitry configured to network the controller 30 with other controllers (e.g., 32, 34) in the control system 12, as well as with historians, remote monitoring and control systems, manufacturing execution systems, and resource management systems, for instance. Further, the communications interface circuitry 46 may also network the controllers 30, 32, and 34 with the off-process laboratory testing facility 26 for receiving offline measurements of certain parameters (e.g., 28) which may be used to validate or correct predicted values 54 of certain process parameters, as discussed above.

Figure 5:
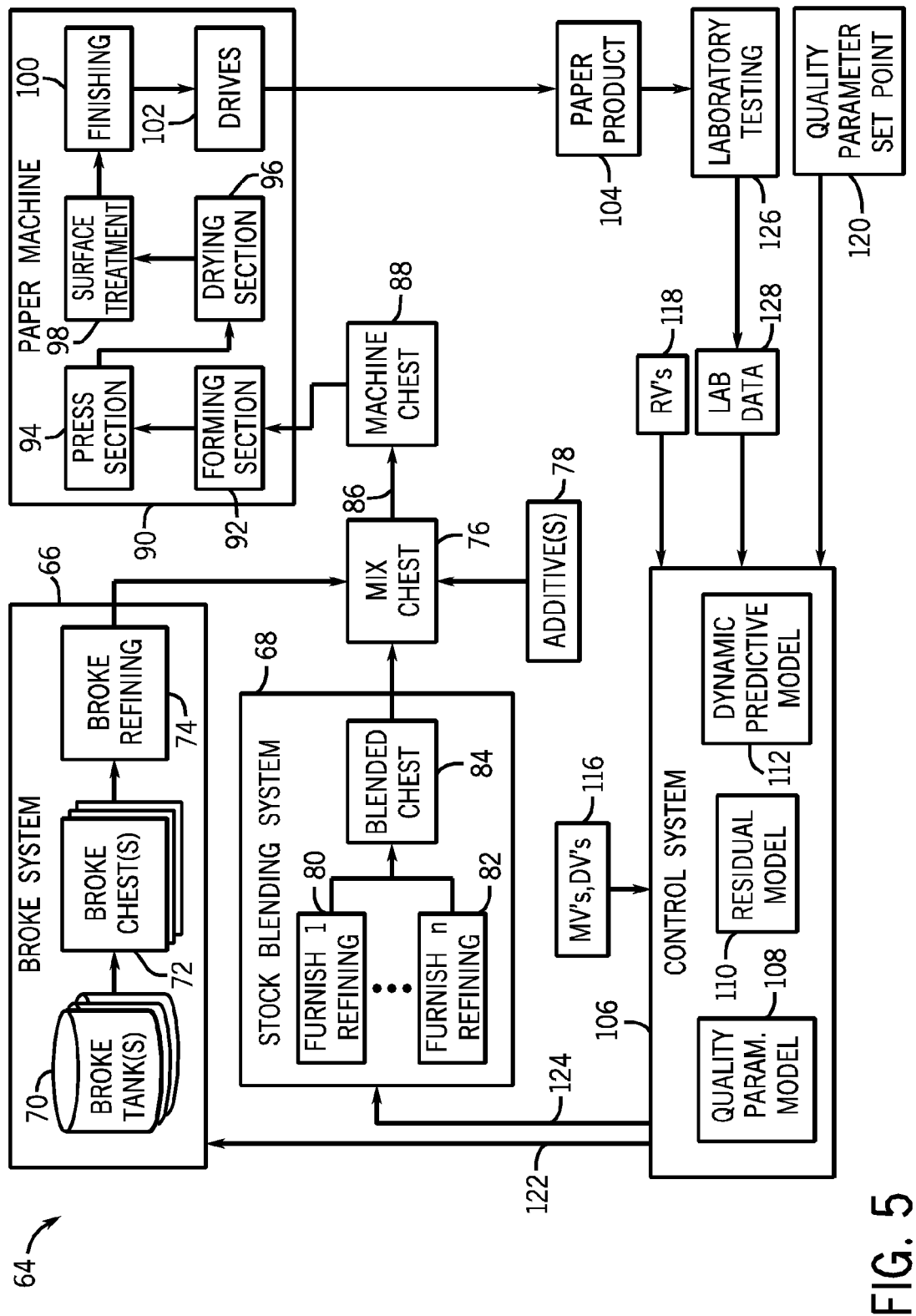
FIG. 5 is a diagrammatical representation of a paper manufacturing plant equipped with a control system including a plurality of control models that may collectively provide for control of the paper manufacturing process in accordance with the present technique.

As mentioned above, the present control techniques may be particularly applicable to a continuous paper manufacturing process, as shown in FIG. 5 and generally designated by the reference numeral 64, although it should be understood that the present technique is not necessarily limited to a paper manufacturing process. The illustrated paper process 64 may be adapted to produce a paper product and may include a broke system 66, a stock blending system 68, and a paper machine 90. The output of the broke system 66 and additional additives materials, including chemical and filler materials are combined with the output of the stock blending system 68 to generate pulp slurry to be processed by a paper machine 90 for the formation of paper, as will be discussed below.

As shown in the present, the broke system 66 may include one or more broke tanks 70 which may store and feed the broke to one or more broke chests 72. Broke from the broke chests 72 may be refined by the broke refining unit 74. The refined broke output of the refining unit 74 is provided to the mix chest 76. Here, additional additives 78, which may include fillers, chemical agents, and starch, may be added to provide certain properties in the paper product. Depending on the specific desired properties of the resulting paper product, a number of additives may be incorporated here or at other locations in the process 64. For example, sizing agents, such as alkylketene dimmer (AKD) or alkylsuccinic anhydrides (ASA) may be added to control the hydrophobicity of the paper product by controlling the amount of water the paper will absorb. For instance, certain paper products adapted for writing may require a relatively slow rate of absorption with regard to the water-based inks that may be used, whereas other paper products used in the cleaning industry are typically engineered to absorb large amounts of water quickly. The filler components may include dyes, clay, talc, and calcium carbonates, for example, which may contribute to the opacity or color characteristics of the paper.

The stock blending system 68 may include various refining units for preparation of a number of refined stock furnishes. In the present embodiment, the stock blending system 68 may include a first furnish refining unit 80 for producing a first furnish stock, though any number of furnish refining units, represented here by the reference number 82, may be provided to produce the necessary stock furnish materials for producing the paper product. These refining units 80-82 may control the fiber development of the stock furnishes that are provided to the blend chest 84. The blend chest 84 output of the stock blending system 68 may then be provided to the mix chest 76 along with the refined broke from the broke system 66 and the additives 78. Once mixed, the contents 86 of the mix chest 76 may be provided to the machine chest 88 prior to being processed by the paper machine 90. The paper machine 90 may include a dilution controlled head box (not shown) through which the contents of the machine chest 94 may be provided to a forming section 92, which may include a wire press, for example. The formed sheets may then be passed through one or more press sections 94 to remove additional water and moisture from the paper before continuing through a series of drying sections 96. The output of the drying sections 96 may then proceed through a surface treatment section 98, a finishing section 100, and one or more drive sections 102. The output of the paper machine 90 may be a finished paper product 104. As will be appreciated, the paper product 104 produced by the paper manufacturing system 64 is commonly stored in reels which may later be apportioned into smaller sizes for distribution to customers (e.g., reams). The broke system 66 and stock blending system 68 may be at least partially controlled by a control system 106. In the presently illustrated embodiment, the control system 106 may be adapted to control and manage the paper manufacturing process 64 by managing a quality parameter or quality parameter constraint, such as internal bond, to achieve a particular quality target in the finished paper product 104. As will be appreciated, the internal bond strength of a sample of paper may be influenced by a variety of factors, such as thickness, filler type or content, fiber type, and surface treatment, among other.

As discussed above, various quality parameters in the paper manufacturing process, including internal bond, may not be directly measurable online and are typically acquired as off-process measurements, such as by using a laboratory or off-process testing facility, referred to here by the reference numeral 126. The control system 106 may include an inferential model 108 configured to estimate a raw quality parameter, an inferential model 110 to estimate a residual component of the quality parameter, and a dynamic predictive control model 112 configured to generate outputs from the control system 106 representing control actions which may manipulate various parameters of the paper manufacturing process 64 based upon the estimated values of the quality parameter and the residual component from the inferential models 108 and 110, respectively, in order to control the quality parameter to meet a target set point, limit, or range, as indicated by the reference numeral 120. For instance, the models 108, 110, and 112 may be stored in a memory circuit 42 of a controller within the control system 106. By way of example only, the control of the internal bond parameter of paper using the present techniques will be discussed below. However, it should be noted that the present techniques may be applicable in controlling various manufacturing processes based on various parameters not typically measurable online and thus, the examples provided herein are not intended to limit the applications of the present technique in this regard.

In the illustrated embodiment, to perform the estimation of the internal bond value, the control system 106 may receive various MV's and DV's, referred to here by the reference numeral 116, from the process system 64. The MV and DV values 116 may be obtained from one or more of the various components of the system 64, including the broke system 66 and the stock refining system 68, and the paper machine 90. For instance, these process variable values may be measured or derived by the sensors 22 discussed above, which may be provided at various locations throughout the process 64 to acquire the necessary MV and DV values 116. The sensed MV and DV values 116 may then be utilized by the quality parameter model 108 to estimate or predict a raw value for the internal bond strength. The sensors 22 may also be used to determine the values of certain residual variables (RV's) of the process 64. As discussed above, RV's are those variables which are not controlled by the optimization control system 106 and are not considered by the inferential model 108 or the dynamic predictive control model 112 for model predictive control purposes. The RV's, however, may represent unmeasured or immeasurable influences (e.g., a residual component) that may account for at least a portion of a prediction error between the raw internal bond prediction output from inferential model 108 and a corresponding off-process internal bond measurement. Depending on the particular parameter subject to control by the control system 106, the RV's may be measured or observed from one or more of the components in the process system 64, including the broke system 66, the stock blending system 68, or the paper machine 90.

The RV's 118 may be provided to the residual model 110 to predict a residual component that may be combined with the output of the quality parameter model 108 to determine a composite estimated value for internal bond based on the MV's and DV's 116 and the RV's 118. One benefit for using the separate residual model 110 is that the quality parameter model 108 may be defined using the same variables as the control model 112, thus eliminating model mismatch in this regard. Based on the composite internal bond estimation, the dynamic predictive model 112 may be implemented to generate the control actions 122 and 124 which may manipulate the appropriate MV's of the process system 64 in order to control the internal bond parameter to meet an optimum target value or range 120. Further, as shown in the present figure, the composite prediction of the internal bond value may be adjusted or corrected prior to being received by the dynamic predictive model 112 by comparing the internal bond prediction with a corresponding off-process internal bond measurement 128 obtained in the offline testing setting 126, such as by performing a destructive test on a sample of the paper product 104. Thus, prediction errors that may be present in the estimated internal bond values received by the dynamic predictive model 112 may be compensated for prior to implementing control actions, thus further increasing the accuracy and effectiveness of the control system 106.

Figure 6:
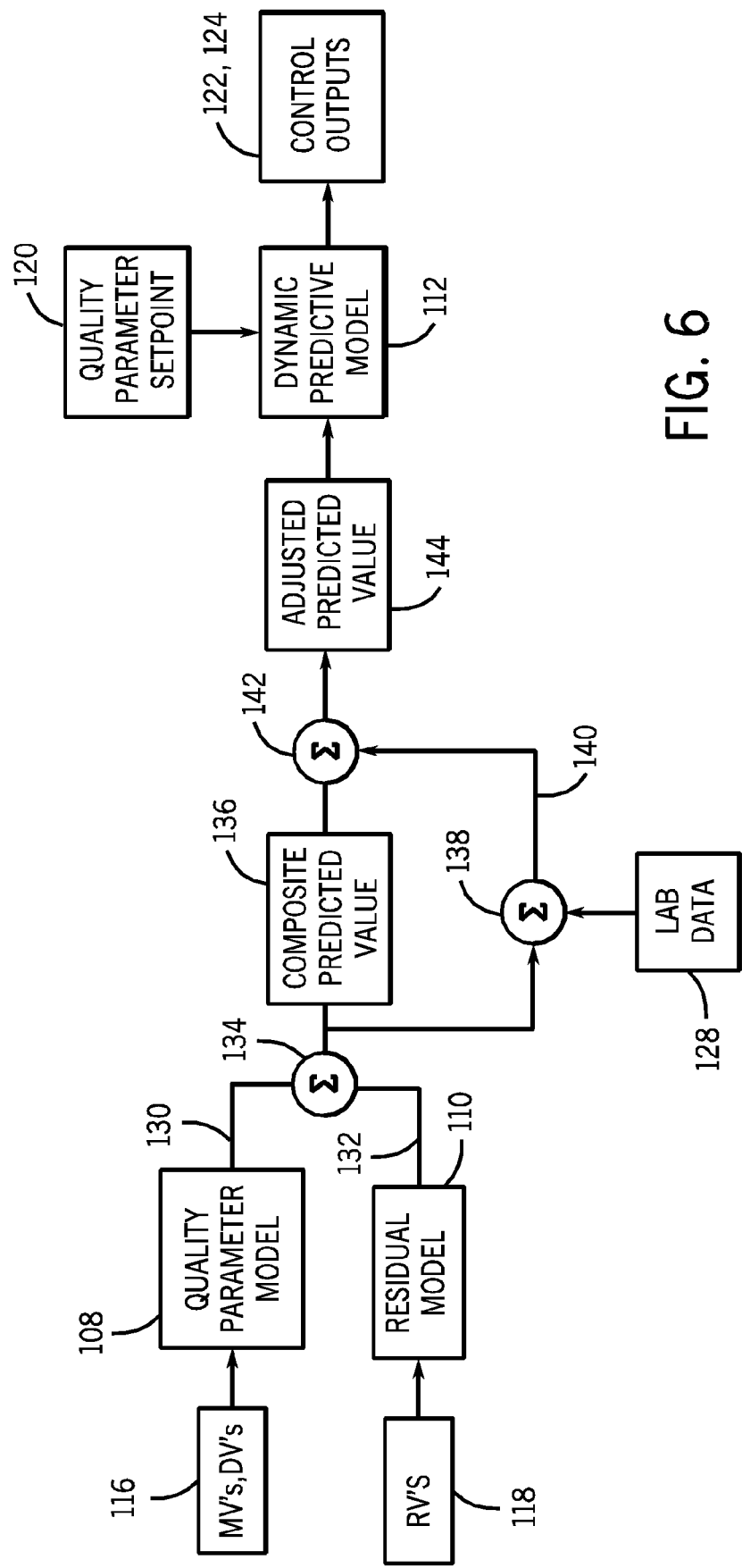
FIG. 6 is a diagrammatical representation of the models that may be implemented in the control system of FIG. 5 to control a quality parameter in the paper manufacturing process.

The control algorithm provided by above-discussed of the control system 106 may be better understood with reference to FIG. 6, which provides a diagrammatical representation illustrating the mutual interactions and lines of communication between the quality parameter model 108, the residual model 110, and the dynamic predictive model 112. As discussed above, the quality parameter model 108 may derive a predicted or estimated value for internal bond based on various MV's and DV's 116 measured or derived from the paper process system 64. For instance, the quality parameter model 108 may include an inferential model, such as a virtual sensor, configured to receive the MV's and DV's 116 and to differentially derive a raw predicted value for internal bond, referred to here by the reference number 130, based on the received MV and DV values 116. By way of example only, in one implementation, the MV's considered by the quality parameter model 108 may include certain process variables relating to the refining of the furnishes (e.g., 80-82), the flow rates of various filler additives, and the flow rates of starch additives, whereas the DV's considered by the quality parameter model 108 may include the acidity (pH level) of the broke content, as well as the estimated fiber strength of the stock furnishes.

The residual model 110 may also include an inferential model adapted to receive the measured or derived values of the RV's 118 from the paper manufacturing process 64 in order to generate an estimated residual component value, referred to here by the reference numeral 132. As discussed above, RV's may be defined as variables which are not controlled by the optimization controller 106 and are not included or considered by the raw prediction inferential model 108 or the dynamic predictive control model 112. For instance, some RV's may represent variables having minimal dynamics and thus minimal feed forward values. However, the residual component 132 may nevertheless have some impact on the resulting quality parameter, such as internal bond. For instance, in the process 64 depicted in FIG. 5, the RV's 118 may represent observable variables present in the broke system 66, stock blending system 68, and/or the paper machine 90 which are not controllable by the optimization controller 106 and are not considered by either the quality parameter model 108 or the dynamic predictive control model 112, but may contribute to a residual component having some influence on the actual measured internal bond values in the resulting paper product 104. In one contemplated embodiment, the prediction of the residual component 132 by the residual model 110 using the RV's 118 may reflect the estimation of an expected difference or prediction error between the raw internal bond value predicted using the quality parameter model 108 and a corresponding internal bond measurement (e.g., 128) determined by an off-process measurement. By way of example only, the RV's considered by the residual model 110 in the above-described implementation may include various head box parameters (e.g., rush drag), forming parameters, press parameters, drying parameters (e.g., steam flow rates), surface treatment parameters, and/or speed or speed-differential parameters in the paper machine 90. As noted above, the quality parameter model 108 and the residual model 110 may be inferential models provided as a virtual sensor and may be implemented using parametric models, neural network models, or linear and non-linear models, for example.

The raw internal bond prediction 130 and the residual component 132 may then be combined by the summation logic 134 to produce a composite estimated value of the internal bond parameter, referred to here by the reference number 136. As mentioned above, the residual component 132 in the present implementation may reflect an expected difference or prediction error between the raw internal bond prediction 130 and a corresponding actual measured internal bond value (e.g., from off-process testing). The combination of the raw predicted value 130 and the residual component 132 may, therefore, provide for a first line of biasing with regard to the raw predicted internal bond value 130 to compensate for an expected prediction error amount such that the composite estimation of internal bond 136 is more accurate when compared to the actual internal bond measurement than the raw predicted internal bond value 130 produced by the quality parameter model 108 alone. Indeed, as will be appreciated, this internal biasing mechanism with regard to the raw internal bond estimation 130 may beneficially improve the overall control of the process 64 by providing a more accurate composite internal bond predicted value 136 which may be used by the control system 106 in determining appropriate control actions to maintain internal bond at the desired set points (e.g., 120).

While this two-part inferential model approach for predicting internal bond may reduce the amount of prediction error in the composite internal bond value 136 relative to the raw internal bond prediction 130, some inaccuracy with regard to the internal bond predictions may still exist due to additional unmeasured disturbances and, in some cases, immeasurable disturbances in the process 64. Thus, the present technique may further provide for additional corrections or compensation of prediction errors that may be present in the composite internal bond estimation 136 using a corresponding internal bond measurement 128 obtained from an off-process testing or measurement procedure. For instance, as shown in the present figure, the output of the summation logic 134 (e.g., the composite internal bond estimation 136) may be compared to the off-process internal bond measurement 128 via the summation logic 138, which may determine a difference between the composite internal bond value 136 and the internal bond off-process measurement 128 representing a prediction error, referred to here by the reference number 140. That is, the prediction error represents a mismatch between the composite internal bond estimation 136 and the actual internal bond measurement 128 due to unmeasured and/or immeasurable disturbances in the process 64.

The prediction error 140 output from the summation logic 138 may then be used as a biasing or corrective factor by the summation logic 142 to adjust the composite internal bond value 136 to produce an adjusted predicted internal bond value, referred to here by the reference number 144. Thus, any prediction error that may be present in the composite internal bond value 136 may be adjusted or compensated for prior to being provided to the dynamic predictive model 112. Additionally, it should be understood that if the summation logic 138 determines that measured internal bond value 128 and the composite internal bond estimated value 136 are equal, then the prediction error 140 may be zero and the adjusted internal bond value 144 may be equal to the composite internal bond estimation 136.

The adjusted internal bond prediction 144 may then be provided to the dynamic predictive model 112 which may be configured to optimize the internal bond of the paper product 104 based upon the adjusted internal bond prediction 144. As discussed above, a dynamic predictive model may be implemented to generate control actions that may manipulate one or more aspects of a process in order to bring certain control variables to a particular desired target set point or objective. Here, the dynamic predictive model 112 may evaluate the adjusted internal bond prediction 144 with respect to the target internal bond set point 120 discussed above. As will be appreciated, the internal bond set point 120 may, in some instances, reflect a desired target internal bond value, range, or upper/lower limit that is expected in the paper product 104 output from the process system 64 in order to define a paper product 104 that is within acceptable quality specifications. Additionally, in some implementations, the desired internal bond set point 120 may include tolerable deviations or ranges that may still produce an acceptable product. Accordingly, if it is determined by the dynamic predictive model 112 that the adjusted internal bond prediction value 144 derived using the quality parameter model 108, the residual model 110, and the laboratory test results 128 deviates from the desired internal bond set points or ranges 120, the dynamic predictive model 112 may generate the appropriate control outputs 122 and 124, which may be provided by the control system 106 to the broke system 66 and the stock blending system 68, respectively. For example, the control action outputs represented by the reference number 122 may represent the adjustment or manipulate one or more MV's associated with the broke system 66, whereas the control actions represented by the reference number 124 may represent the adjustment or manipulate one or more MV's associated with the stock blending system 68 of the paper manufacturing process 64. In practice, these MV adjustments implemented by the control actions 122 and 124 may function to drive the internal bond parameter of the paper product 104 towards the desired internal bond range or set point 120, thus effectively controlling the quality of the resulting paper product 104.

Figure 7:
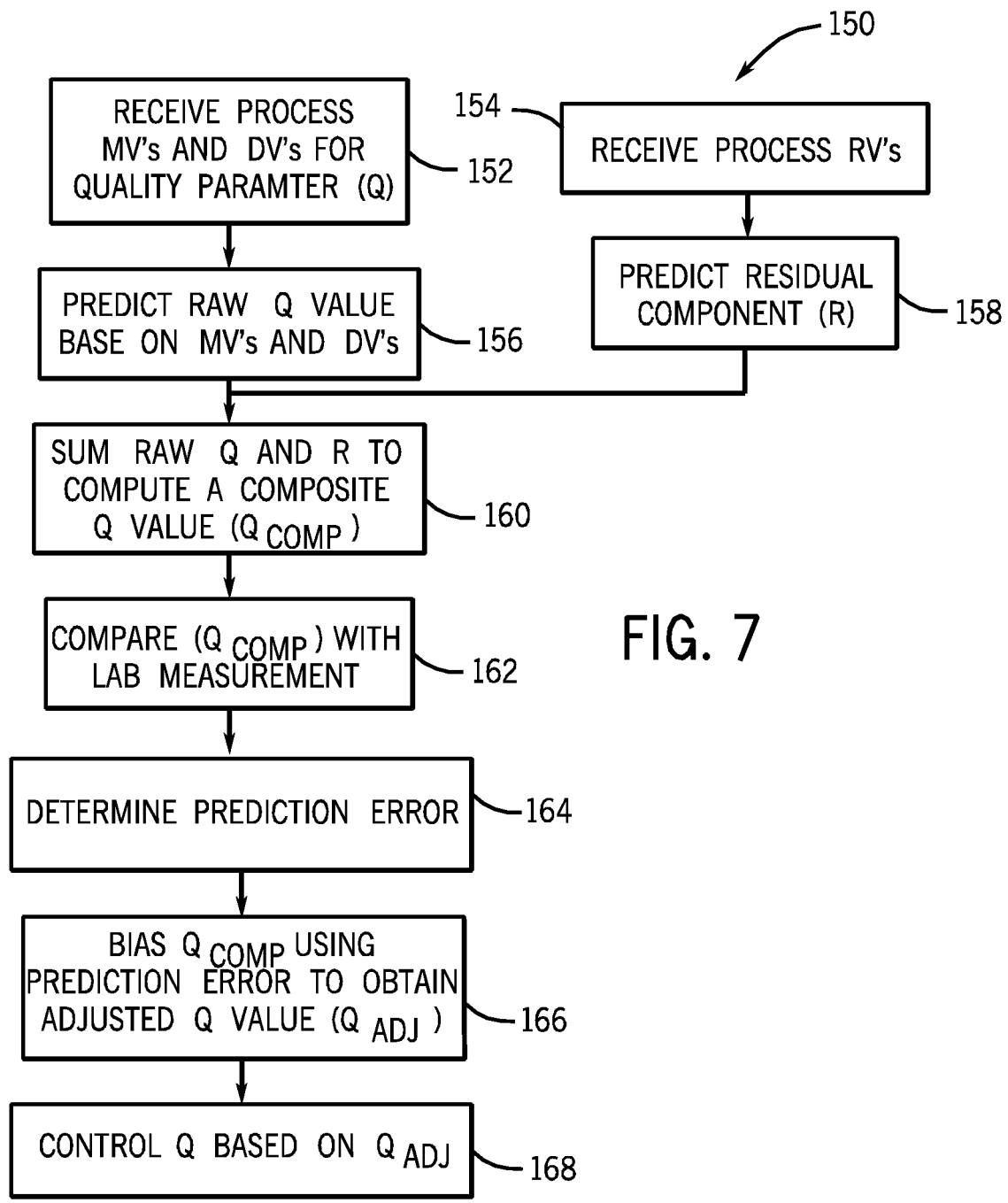
FIG. 7 illustrates exemplary logic for carrying out the present technique for controlling a quality parameter in accordance with the present technique.

Continuing now to FIG. 7, exemplary logic 150 for carrying out the control of a quality parameter in a paper manufacturing process based on the model predictive control techniques generally described in FIG. 6 is illustrated. The logic 150 may be implemented by the processing circuitry 38 discussed above with reference to FIG. 3. Further, although the logic 150 will be described below with reference to the paper manufacturing examples described above (e.g., FIGS. 5-6) and, particularly with reference to the control of an internal bond parameter in a paper product, it should nevertheless be appreciated that the techniques set forth in FIG. 7 may be applicable to a variety of manufacturing processes requiring the online control of a quality parameter that is typically not directly measurable online.

The logic 150 may begin with the receiving of MV's and DV's at step 152 and the receiving of RV's at step 154. As discussed above, the MV's and DV's 116 and the RV's 118 may be measured or derived from the process system 64 through the use of the sensors 22. At step 156, a raw estimation of internal bond may be derived using the MV's and DV's acquired in step 152, such as by using an inferential model. For example, step 156 may include the use of the quality parameter model 108 discussed above in deriving a raw estimated value of internal bond 130. At step 158, the RV's acquired at step 154 may be used by the residual model 110 to estimate a residual component 132 of the internal bond parameter. As discussed above, the RV's (e.g., 118) may represent additional observable variables not controlled by the optimization control system 106 and not considered by the inferential model 108 or the dynamic predictive control model 112. The RV's 118, however, may represent uncontrolled influences contributing to an expected error or offset between the actual internal bond value and the raw internal bond estimation 130. Next, at step 160, the raw predicted value 130 and the residual component 132 may be summed to produce a composite estimated value 136 for internal bond that may have a reduced amount of prediction error compared to the raw internal bond prediction 130. Thereafter, at step 162, the composite internal bond value 136 may be compared with a corresponding off-process measurement of internal bond (e.g., 128). At step 164, the prediction error (e.g., 140) between the composite value 136 and the actual off-process measured value 128 may be determined.

Next, at step 166, the composite internal bond estimation 136 may be biased using the prediction error 140 determined at step 164 to produce an adjusted internal bond prediction 144. Thereafter, the adjusted internal bond prediction 144 may be provided to a dynamic predictive model (e.g., 112) to implement control actions in the system, as indicated by step 168. For instance, as described above, the dynamic predictive model 112 may output the control actions 122 and 124 which may include the adjustment of one or more MV's received at step 152 with the desired effect of bringing the internal bond value towards a target set point or range (e.g., 120). It should be understood that if no mismatch exists between the composite internal bond value 136 and the off-process measurement 128, the optimization steps described herein may be implemented in a similar manner using the composite internal bond value 136 (e.g., the prediction error is 0 and the composite value 136 is equivalent to the adjusted value 144).

Figure 8:
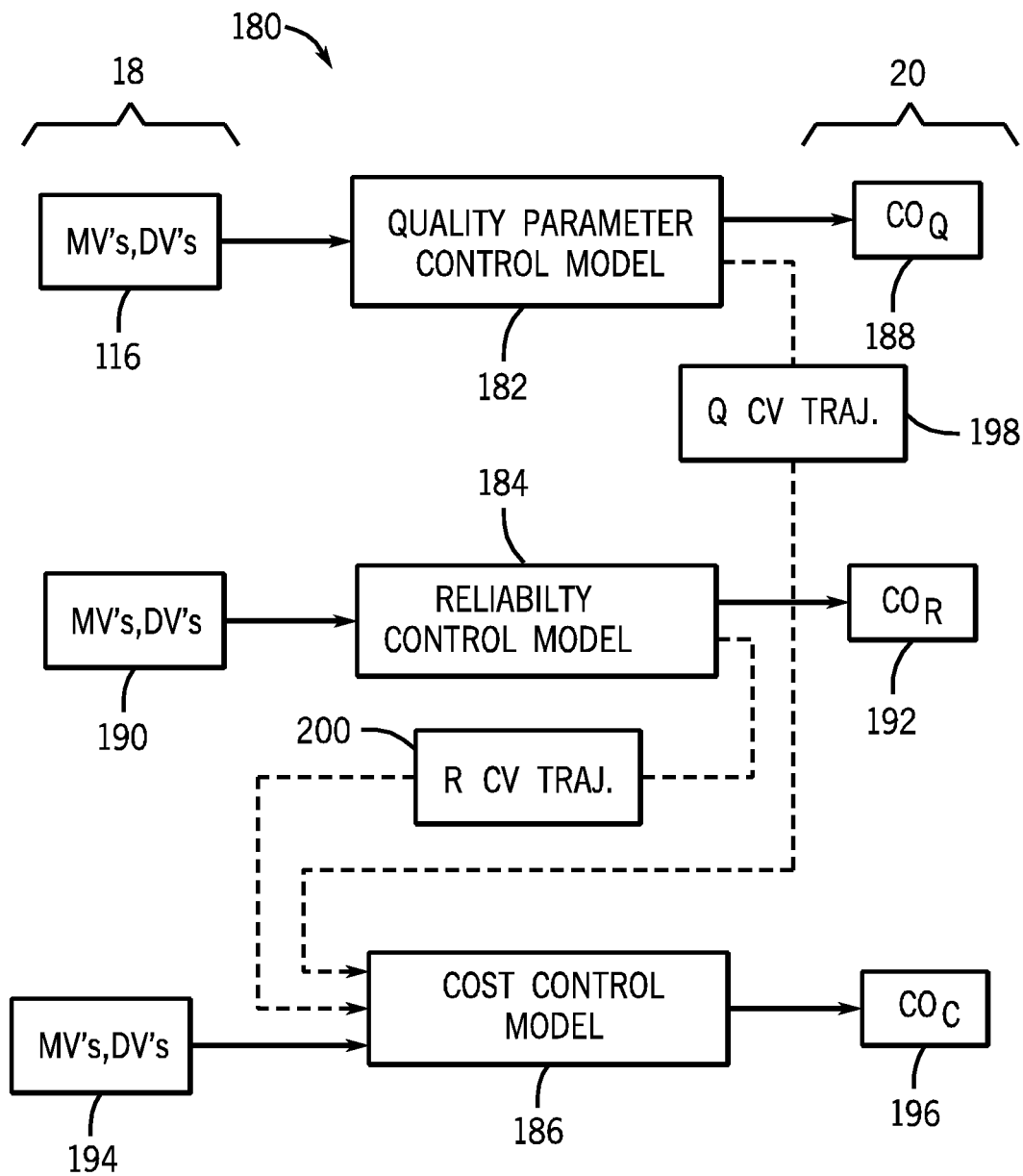
FIG. 8 is a diagrammatical representation illustrating multiple controllers that may be implemented in a control system to control a quality parameter while taking cost optimization factors into account in accordance with an embodiment of the present invention.

As mentioned above in FIG. 2, a control system in accordance with the present techniques may utilize a plurality of controllers in controlling a process. For example, in some implementations, in addition to controlling a process based on a quality parameter target, a control system may further take into account additional factors, such as those related to process reliability and cost optimization, in implementing control. Referring now to FIG. 8, a diagrammatical representation of three separate control models 182, 184, and 186 that may be implemented in a control system 180 in accordance with a presently contemplated embodiment is illustrated. As shown here, the control model 182 may be adapted to control a quality parameter of a process, such as an internal bond parameter of paper, the control model 184 may be adapted to control one or more reliability or production limiting parameters of the process, and the control model 186 may be adapted to minimize the overall production cost of the process. Each of the control models 182, 184, and 186 may receive respective process inputs 18 in order to generate control outputs 20. In accordance with the techniques described above, each of the control models 182, 184, and 186 may implement various dynamic model predictive techniques.

By way of example, the quality parameter control model 182 may be implemented in the control system 106 of FIG. 5 for controlling a paper quality parameter, such as internal bond. As shown in the present figure, the quality parameter control model 182 may receive the MV's and DV's 116 from the paper manufacturing process 64 in order to generate the appropriate control outputs $CO_Q$ 188 for controlling the quality parameter (e.g., internal bond). The production or reliability control model 184 may include one or more process and/or production reliability functions and be adapted to control various production parameters of the paper manufacturing process 64, such as a white water consistency parameter. The control model 184 may receive the MV's and DV's represented by the reference number 190 to generate the control outputs $CO_R$ 192 for controlling the production or reliability parameters of the process. Further, the cost control model 186 may be adapted to control the cost of the paper production process, such as by minimizing cost variables over a control horizon, and may receive various cost-related MV's and DV's 194 to generate the appropriate control actions $CO_C$ 196 for controlling production costs As will be appreciated, the control system 180 may include a mechanism to ensure that the minimization of production costs by the cost controller 186 does not sacrifice the quality of the paper product (e.g., 104) or the reliability of the paper manufacturing process 64, such as during production periods where costs increase due to external disturbances. In the present embodiment, the mechanism may be implemented by providing the CV trajectories 198 and 200 to the cost controller 186 over the entire control horizon. As discussed above, a trajectory may represent desired future values or set points for particular process variables over a period of time. Thus, the CV trajectory 198 may represent the desired control variable trajectory for the quality parameter (e.g., internal bond) controlled by the quality parameter control model 182 and the CV trajectory 200 may represent the desired control variable trajectory for the reliability parameters controlled by the reliability control model 184. The CV trajectories 198 and 200 may be viewed as constraints by the cost control model 186. That is, the control actions 196 determined by the cost control model 186 are implemented in such a manner that the optimization of costs does not cause the quality parameter or the reliability parameters to deviate from their respective trajectories 198 and 200 over the control horizon. As will be appreciated, the cost optimization techniques set forth in the present disclosure provides an improvement compared to controlling production costs based on indirect or vague measurements of efficiency, such as by using hourly, shift, or daily averages of production output or cost amounts. Further, it should be understood that the control models 182, 184, and 186 may be implemented either using separate controllers or may be implemented using the same controller.

While the above techniques have been described primarily with reference to the control of a paper quality parameter, it should be understood that the present techniques are also applicable to production parameters, such as white water consistency parameters, as well as cost parameters. Further, it should be further understood that the present techniques are not limited to paper manufacturing processes. Rather, the present techniques are applicable to any suitable process in which the controlled parameter is not directly measurable online.

The techniques described herein may be implemented in any suitable manner, including hardware-based circuitry or a computer program having executable code stored on one or more tangible computer-readable media. Additionally, the techniques described herein may also be implemented using a combination of both hardware and software elements, as will be appreciated by those skilled in the art.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for managing a parameter in a paper manufacturing process comprising:
    determining a predicted value for the parameter based on one or more other parameters of the paper manufacturing process;
    determining a residual component based on one or more residual variables of the paper manufacturing process, wherein the one or more residual variables represent uncontrolled but observable parameters of the paper manufacturing process;
    combining the predicted value and the residual component to determine a composite predicted value for the parameter;
    determining an adjusted predicted value for the parameter, wherein the adjusted predicted value compensates for a prediction error in the composite predicted value;
    comparing the adjusted predicted value to a corresponding target set point or range for the parameter; and
    managing the parameter based at least partially on the comparison.

2. The method of claim 1, wherein determining each of the predicted value and the residual component is performed using at least one inferential model, and wherein managing the parameter is performed using at least one dynamic predictive model.

3. The method of claim 2, wherein the one or more residual variables are not considered by the at least one inferential model or the at least one dynamic predictive model, and wherein the residual component represents an estimated error between the predicted value and an actual value of the parameter.

4. The method of claim 3, wherein the paper manufacturing process comprises a paper machine, and wherein at least one of the residual variables is determined based upon at least one operating parameter of the paper machine.

5. The method of claim 4, wherein the one or more residual variables comprises at least one of a head box parameter, a forming parameter, a pressing parameter, a drying parameter, a surface treatment parameter, a speed parameter of the paper machine, or a speed differential parameter between two or more sections of the paper machine, or any combination thereof.

6. The method of claim 1, wherein the one or more parameters used in determining the predicted value comprises one or more manipulated variables or disturbance variables, or a combination thereof.

7. The method of claim 6, wherein the one or more manipulated variables comprises at least one of a flow rate of a stock furnish, a flow rate of a chemical additive, a flow rate of a filler material, a flow rate of a starch material, a flow rate of a sizing agent, a flow rate of a dye, the physical manipulation of stock fibers, or any combination thereof.

8. The method of claim 6, wherein the one or more disturbance variables comprises at least one of an acidity level or a fiber strength, or any combination thereof.

9. The method of claim 6, wherein controlling the parameter based at least partially on the comparison is performed using a dynamic predictive model configured to manipulate at least one of the manipulated variables to drive the adjusted predicted value towards the target set point or range if the comparison indicates that the adjusted predicted value deviates from the target set point or range.

10. The method of claim 9 wherein the target set point comprises a range of acceptable values.

11. The method of claim 1, wherein managing the parameter is further based on at least one cost optimization function configured to minimize the costs of running the process.

12. The method of claim 1, wherein determining an adjusted predicted value comprises:
    receiving an off-process measurement of the parameter;
    comparing the composite predicted value to the off-process measurement to determine the prediction error; and
    biasing the composite predicted value using the prediction error.

13. The method of claim 1, wherein the parameter is a paper quality parameter, a paper production parameter, or a paper cost parameter.

14. The method of claim 13, wherein the paper quality parameter is an internal bond strength parameter.

15. A process controller for managing a parameter in a paper manufacturing process comprising:
    a processor;
    an input configured to receive process information, the process information comprising at one or more manipulated variables or disturbance variables, or a combination thereof, and one or more residual variables of the paper manufacturing process, wherein the one or more residual variables represent uncontrolled but observable parameters of the paper manufacturing process;
    a memory device comprising instructions executable by the processor, the instructions comprising:
        instructions for utilizing a first inferential model to determine a predicted value for the parameter based on the one or more manipulated variables or disturbance variables, or the combination thereof;

instructions for utilizing a second inferential model to determine a residual component based on the one or more residual variables;

instructions for computing a composite predicted value for the parameter by combining the predicted value and the residual component;

instructions for determining an adjusted predicted value for the parameter, wherein the adjusted predicted value compensates for a prediction error in the composite predicted value;

instructions for comparing the adjusted predicted value for the parameter to a corresponding target set point or range; and instructions for utilizing a dynamic predictive model to manage the parameter during the paper manufacturing process based at least partially upon the comparison.

16. The process controller of claim 15, wherein the management of the parameter by the dynamic predictive model is further based upon one or more cost optimization functions for minimizing production costs.

17. The process controller of claim 15, wherein the management of the parameter by the dynamic predictive model is further based upon one or more reliability functions for optimizing production.

18. The process controller of claim 15, wherein the residual component represents an estimated error between the predicted value and an actual value of the parameter.

19. The process controller of claim 15, wherein the dynamic predictive model is configured to manage the parameter by manipulating at least one of the manipulated variables to drive the adjusted predicted value towards the target set point or range if the comparison indicates that the adjusted predicted value deviates from the target set point or range.

20. The process controller of claim 15, wherein the instructions for determining the adjusted predicted value for the parameter comprise:

instructions for receiving an off-process measurement of the parameter;

instructions for comparing the composite predicted value to the off-process measurement to determine the prediction error; and instructions for biasing the composite predicted value using the prediction error.

21. The process controller of claim 15, wherein the parameter is an internal strength bond parameter.

* * * * *